United States Patent
Alwattari et al.

(10) Patent No.: US 10,696,894 B2
(45) Date of Patent: Jun. 30, 2020

(54) METHODS OF TREATING SUBTERRANEAN FORMATIONS INCLUDING SEQUENTIAL USE OF AT LEAST TWO SURFACTANTS

(71) Applicant: Halliburton Energy Services, Inc., Houston, TX (US)

(72) Inventors: Ali Alwattari, The Woodlands, TX (US); Liang Xu, The Woodlands, TX (US); Jeremy Holtsclaw, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/557,833

(22) PCT Filed: Apr. 7, 2015

(86) PCT No.: PCT/US2015/024699
§ 371 (c)(1),
(2) Date: Sep. 13, 2017

(87) PCT Pub. No.: WO2016/163993
PCT Pub. Date: Oct. 13, 2016

(65) Prior Publication Data
US 2018/0291256 A1    Oct. 11, 2018

(51) Int. Cl.
| | |
|---|---|
| C09K 8/68 | (2006.01) |
| C09K 8/60 | (2006.01) |
| C09K 8/80 | (2006.01) |
| E21B 43/26 | (2006.01) |
| C09K 8/86 | (2006.01) |
| C09K 8/64 | (2006.01) |
| C09K 8/82 | (2006.01) |

(Continued)

(52) U.S. Cl.
CPC ............... *C09K 8/68* (2013.01); *C09K 8/602* (2013.01); *C09K 8/64* (2013.01); *C09K 8/80* (2013.01); *C09K 8/82* (2013.01); *C09K 8/86* (2013.01); *E21B 43/26* (2013.01); *C09K 2208/28* (2013.01); *E21B 43/11* (2013.01); *E21B 43/267* (2013.01)

(58) Field of Classification Search
None
See application file for complete search history.

(56) References Cited

U.S. PATENT DOCUMENTS

| | | | | |
|---|---|---|---|---|
| 4,796,702 A | * | 1/1989 | Scherubel | C09K 8/536 166/308.6 |
| 5,614,474 A | * | 3/1997 | Varadaraj | B09C 1/02 507/225 |
| 6,291,406 B1 | | 9/2001 | Rose et al. | |

(Continued)

OTHER PUBLICATIONS

International Search Report and Written Opinion issued in corresponding application No. PCT/US2015/024699 dated Jan. 7, 2016, 9 pgs.

*Primary Examiner* — Jeffrey D Washville
(74) *Attorney, Agent, or Firm* — Chamberlain Hrdlicka

(57) ABSTRACT

Various embodiments disclosed relate to methods of treating subterranean formations including sequential use of at least two surfactants. In various embodiments, the present invention provides a method of treating a subterranean formation including sequentially placing in the subterranean formation a penetrating-aid surfactant and a pore-declogging surfactant.

5 Claims, 2 Drawing Sheets

(51) Int. Cl.
 *E21B 43/11* (2006.01)
 *E21B 43/267* (2006.01)

(56) References Cited

U.S. PATENT DOCUMENTS

| | | | |
|---|---|---|---|
| 7,718,584 B2 | 5/2010 | Welton et al. | |
| 7,893,010 B2 | 2/2011 | Ali et al. | |
| 2003/0082128 A1* | 5/2003 | LeGrow | A61K 8/891 |
| | | | 424/70.12 |
| 2003/0083206 A1* | 5/2003 | Masikewich | C09K 8/22 |
| | | | 507/265 |
| 2013/0175032 A1 | 7/2013 | Brannon et al. | |
| 2013/0233559 A1 | 9/2013 | Van Zanten et al. | |
| 2013/0331301 A1 | 12/2013 | Falana et al. | |
| 2015/0344769 A1* | 12/2015 | Suresh | C09K 8/592 |
| | | | 166/305.1 |

\* cited by examiner

METHODS OF TREATING SUBTERRANEAN FORMATIONS INCLUDING SEQUENTIAL USE OF AT LEAST TWO SURFACTANTS

BACKGROUND

During hydraulic fracturing, high friction between a fracturing fluid and the subterranean formation can require extra time and energy to pump the composition downhole. During pre-pad or pad fluid injection, insufficient wetting of the fracturing composition on the subterranean formation can decrease the effective fracturing area, and lack of miscibility between the fracturing fluid and hydrocarbon materials downhole can hinder penetration of the fracturing fluid. After fracturing has occurred, the subterranean formation can resist the flow of hydrocarbons due to viscous gel blocking pore throats and due to insufficient wettability of hydrocarbons on downhole surfaces.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
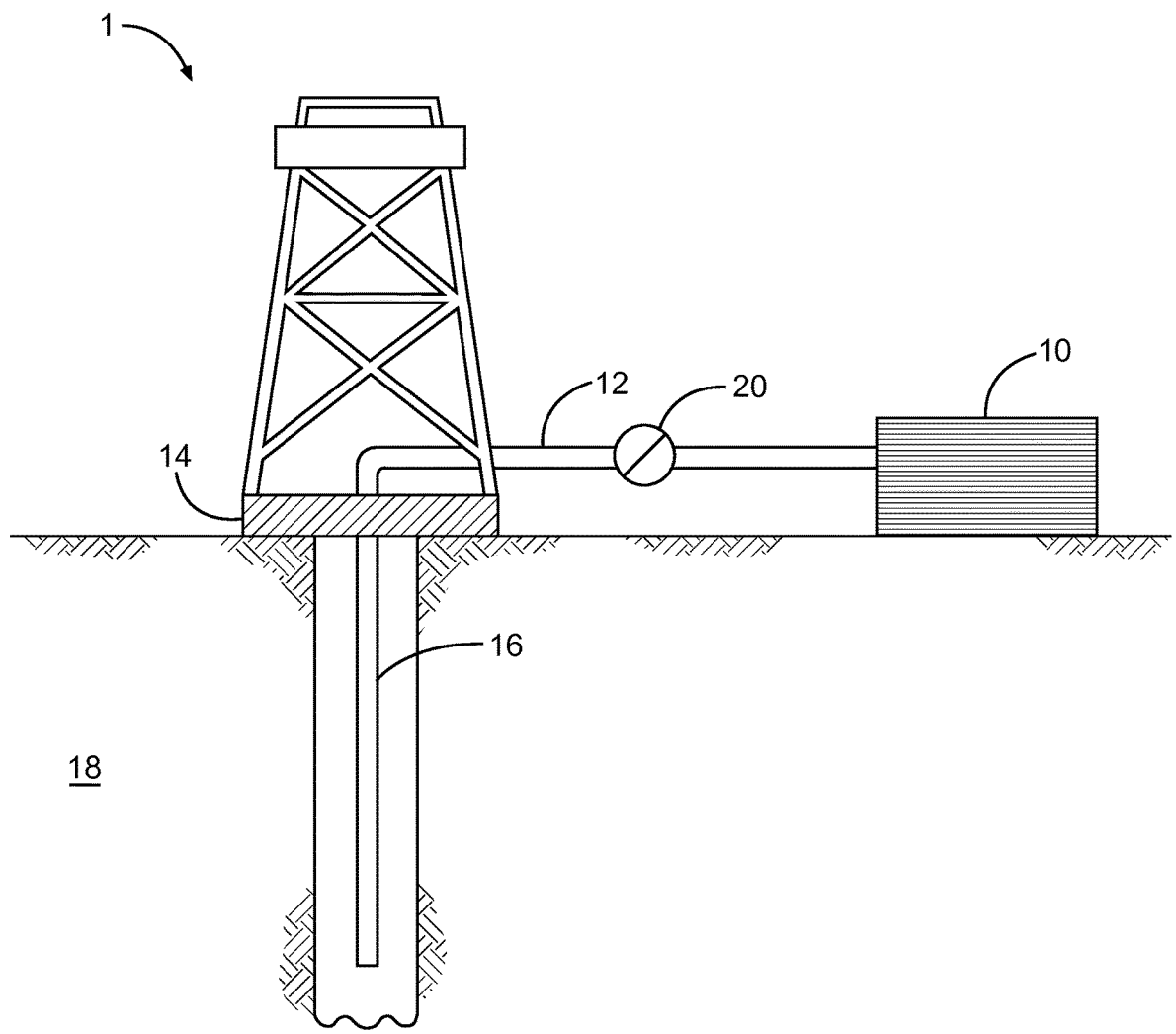
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, $(CH_2)_{0-2}N(R)N(R)_2$, $N(R)N(R)C(O)R$, $N(R)N(R)C(O)OR$, $N(R)N(R)CON(R)_2$, $N(R)SO_2R$, $N(R)SO_2N(R)_2$, $N(R)C(O)OR$, $N(R)C(O)R$, $N(R)C(S)R$, $N(R)C(O)N(R)_2$, $N(R)C(S)N(R)_2$, $N(COR)COR$, $N(OR)R$, $C(=NH)N(R)_2$, $C(O)N(OR)R$, and $C(=NOR)R$, wherein R can be hydrogen or a carbon-based moiety; for example, R can be hydrogen, $(C_1-C_{100})$hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neo-pentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, $-CH=CH(CH_3)$, $-CH=C(CH_3)_2$, $-C(CH_3)=CH_2$, $-C(CH_3)=CH(CH_3)$, $-C(CH_2CH_3)=CH_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula $N(group)_3$ wherein each group can independently be H or non-H, such as alkyl, aryl, and the like. Amines include but are not limited to $R-NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "fracturing fluid" refers to fluids or slurries used downhole during fracturing operations.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including stimulation, hydraulic fracturing, acidizing, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thio sulfate, sulfite, carbonate, chromate, dichromate, peroxide, or oxalate.

In various embodiments, the present invention provides a method of treating a subterranean formation. The method includes sequentially placing in the subterranean formation a penetrating-aid surfactant and a pore-declogging surfactant.

In various embodiments, the present invention provides a method of treating a subterranean formation. The method includes placing in the subterranean formation a first composition including a penetrating-aid surfactant or a pore-declogging surfactant. The method also includes placing in the subterranean formation a second composition including a penetrating-aid surfactant or a pore-declogging surfactant. The placing of the first composition and the second composition in the subterranean formation includes sequentially placing the penetrating-aid surfactant and the pore-declogging surfactant in the subterranean formation.

In various embodiments, the present invention provides a method of hydraulically fracturing a subterranean formation. The method includes placing in the subterranean formation a first composition that is at least one of a pre-pad fluid and a pad fluid. The first composition includes either a penetrating-aid surfactant or a pore-declogging surfactant. The method includes placing in the subterranean formation a second composition that is at least one of a pad fluid and a proppant slurry. The second composition includes the other of a penetrating-aid surfactant and the pore-declogging surfactant. The method includes fracturing the subterranean formation with the second composition.

In various embodiments, the present invention provides a method of hydraulically fracturing a subterranean formation. The method includes placing in the subterranean formation a first composition that is at least one of a pre-pad fluid and a pad fluid. The first composition includes a penetrating-aid surfactant that is at least one of (a), (b), (c), (d), (e), (f), (g), (h), and (i). Penetrating-aid surfactant (a) is an ethyne substituted at the 1- and 2-positions with a substituted or unsubstituted hydroxy$(C_1-C_{20})$hydrocarbyl. Penetrating-aid surfactant (b) is a $((C_5-C_{50})$hydrocarbyl$)-(O-(C_2-C_3)$alkyl$)_n$-$R^1$, a $((C_5-C_{50})$hydrocarbyl$)-O-S(O)_2-(O-(C_2-C_3)$alkyl$)_n$-$R^1$, or a $((C_5-C_{50})$hydrocarbyl$)-O-(C_2-C_3)$alkyl$)_n$-$O-S(O)_2-OH$ or a salt thereof. Each $(C_2-C_3)$alkyl is independently selected and is substituted or unsubstituted. The $(C_5-C_{50})$hydrocarbyl is substituted or unsubstituted. The variable $R^1$ is —H or —OH. The variable n is about 1 to about 1,000. Penetrating-aid surfactant (c) is a perfluoro $(C_1-C_{20})$alkyl-$(C_0-C_{20})$hydrocarbyl-$S(O)_2NH-(C_1-C_{20})$ hydrocarbyl-$N^+((C_1-C_{20})$alkyl$)_2$-$(C_0-C_{20})$hydrocarbyl-$C(O)$ $O^-$, or a salt thereof. Each $(C_0-C_{20})$hydrocarbyl is substituted or unsubstituted and is independently selected. The $(C_1-C_{20})$hydrocarbyl is substituted or unsubstituted. Each $(C_1-C_{20})$alkyl is independently selected and is substituted or unsubstituted. Penetrating-aid surfactant (d) is a $(C_5-C_{50})$alkylbenzene sulfonate salt. Penetrating-aid surfactant (e) is a $(C_1-C_{50})$alkylphenol ethoxylate. Penetrating-aid surfactant (f) is a $(C_1-C_{50})$hydrocarbylalcohol ethoxylate. Penetrating-aid surfactant (g) is a $(C_5-C_{50})$fatty acid ethoxylate. Penetrating-aid surfactant (h) is a $(C_1-C_{50})$alkyl mono- or poly-glycoside. Penetrating-aid surfactant (i) is a sorbitan ester of a $(C_5-C_{50})$fatty acid. The method includes fracturing the subterranean formation with the first composition. The method includes placing in the subterranean formation a second composition that is a proppant slurry. The second composition includes a pore-declogging surfactant that is at least one of (j), (k), and (l). Pore-declogging surfactant (j) is $R^2_3SiO-(R^2_2SiO)_{k1}-(R^3R^2SiO)_{k2}-(R^1_2SiO)_{k3}-SiR^2_3$. At each occurrence, $R^2$ is independently substituted or unsubstituted $(C_1-C_5)$hydrocarbyl. At each occurrence, $R^3$ is independently substituted or unsubstituted $(C_6-C_{50})$hydrocarbyl. The variables k1, k2, and k3 are each independently about 0 to about 10,000. The sum k2+k3 is at least about 1. Pore-declogging surfactant (k) is a substituted or unsubstituted phenyl$(C_0-C_{20})$hydrocarbylsulfonic acid or a salt thereof, wherein the $(C_0-C_{20})$hydrocarbyl is substituted or unsubstituted. Pore-declogging surfactant (l) is a $(C_1-C_{50})$ alkyl polyoxyethylene $(C_1-C_{10})$glycol. The method also includes fracturing the subterranean formation with the second composition.

In various embodiments, the present invention provides a system including a tubular disposed in a formation. The subterranean formation includes a first composition including either a penetrating-aid surfactant or a pore-declogging surfactant. The system includes a pump configured to pump a second composition into the subterranean formation through the tubular. The second composition includes the other of the penetrating-aid surfactant and the pore-declogging surfactant.

In various embodiments, the present invention provides a system including a tubular disposed in a fractured subterranean formation. The fractured subterranean formation includes a first composition that is at least one of a pre-pad fluid and a pad fluid, the first composition including either a penetrating-aid surfactant or a pore-declogging surfactant. The system includes a pump configured to pump a second composition into the subterranean formation through the tubular. The second composition is at least one of a pad fluid and a proppant slurry. The second composition includes the other of the penetrating-aid surfactant and the pore-declogging surfactant.

Various embodiments of the present invention provide certain advantages over other methods of hydraulic fracturing, at least some of which are unexpected. For example, in various embodiments, due to different mechanisms of action, it is unexpected to use a penetrating-aid surfactant and a pore-declogging surfactant together sequentially. In various embodiments, the penetrating-aid surfactant can increase permeation of the pre-pad or pad fluid into the subterranean formation, thereby providing more effective fracturing with deeper fractures. In various embodiments, the penetrating-aid surfactant can increase wetting of the pre-pad or pad fluid in the subterranean formation, thereby providing a larger fracturing area. In various embodiments, the penetrating-aid surfactant can reduce friction between at least one of the pre-pad or pad fluid and the subterranean formation, thereby lowering pumping time and costs. In various embodiments, the penetrating-aid surfactant can emulsify or solubilize the pre-pad or pad fluid in hydrocarbon liquids and aqueous liquids present in the subterranean formation, thereby providing more effective fracturing with deeper fractures.

In various embodiments, the pore-declogging surfactant can increase the wetting of hydrocarbons in the subterranean formation, thereby increasing the production rate. In various embodiments, the pore-declogging surfactant can help to unclog and disperse viscous gel residue in pores of the subterranean formation, thereby reducing cleanup time and providing a greater production rate. In various embodiments, the pore-declogging surfactant can help to demulsify hydrocarbons from aqueous compositions.

In various embodiments, the sequential use of the penetrating-aid surfactant and the pore-declogging surfactant can provide more effective hydraulic fracturing with less time and money spent on pumping compositions into the subterranean formation. In various embodiments, the sequential use of the penetrating-aid surfactant and the pore-declogging surfactant can provide a greater production rate than other methods of hydraulic fracturing. In various embodiments, the sequential use of the penetrating-aid surfactant and the pore-declogging surfactant can provide decreased downtime during a hydraulic fracturing treatment. In various embodiments, the sequential use of the penetrating-aid surfactant and the pore-declogging surfactant can provide a greater production rate per dollar spent on the hydraulic fracturing treatment than other methods of hydraulic fracturing. In various embodiments, the sequential use of the penetrating-aid surfactant and the pore-declogging surfactant can provide reduced cleanup time after the fracturing.

Method of Treating a Subterranean Formation.

In various embodiments, the present invention provides a method of treating a subterranean formation. The method includes sequentially placing in the subterranean formation a penetrating-aid surfactant and a pore-declogging surfactant, in any order. In some embodiments, the penetrating-aid surfactant can be a component of a first or second composition. In some embodiments, the pore-declogging surfactant can be a component of a first or second composition.

In various embodiments, the present invention provides a method of treating a subterranean formation. The method includes placing in the subterranean formation a first composition including either a penetrating-aid surfactant or a pore-declogging surfactant. The method also includes placing in the subterranean formation a second composition including the other of the penetrating-aid surfactant and the pore-declogging surfactant. The placing of the first composition and the second composition in the subterranean formation includes sequentially placing the penetrating-aid surfactant and the pore-declogging surfactant (e.g., in any order) in the subterranean formation. In various embodiments, the method can include any suitable subterranean treatment, such as hydraulic fracturing, enhanced oil recovery, or matrix acidizing.

In various embodiments, the present invention provides a method of hydraulically fracturing a subterranean formation. The method includes placing a first composition including a penetrating-aid surfactant or a pore-declogging surfactant in a subterranean formation. The placing of the composition in the subterranean formation can include contacting the first composition and any suitable part of the subterranean formation, or contacting the first composition and a subterranean material, such as any suitable subterranean material. The subterranean formation can be any suitable subterranean formation. In some examples, the placing of the first composition in the subterranean formation includes contacting the first composition with or placing the first composition in at least one of a fracture, at least a part of an area surrounding a fracture, a flow pathway, an area surrounding a flow pathway, and an area desired to be fractured (e.g., fractured using the first composition, fractured using the second composition, or a combination thereof). The placing of the first composition in the subterranean formation can be any suitable placing and can include any suitable contacting between the subterranean formation and the composition. The placing of the first composition in the subterranean formation can include at least partially depositing the first composition in a fracture, flow pathway, or area surrounding the same. In some embodiments, the method includes obtaining or providing the first composition. The obtaining or providing of the first composition can occur at any suitable time and at any suitable location. The obtaining or providing of the first composition can occur above the surface. The obtaining or providing of the composition can occur in the subterranean formation (e.g., downhole).

The method includes placing a second composition in the subterranean formation. The second composition can be placed in the subterranean formation after placing the first composition in the subterranean formation. The second composition includes a penetrating-aid surfactant or a pore declogging surfactant, such that the placing of the first composition and the placing of the second composition is sequential placing of the penetrating-aid surfactant and the pore declogging surfactant, in any suitable order, in the subterranean formation. The placing of the second composition in the subterranean formation can include contacting the second composition and any suitable part of the subterranean formation, or contacting the second composition and a subterranean material, such as any suitable subterranean material. The subterranean formation can be any suitable subterranean formation. In some examples, the placing of the second composition in the subterranean formation includes contacting the second composition with or placing the second composition in at least one of a fracture (e.g., a fracture formed using the first composition), at least a part of an area surrounding a fracture, a flow pathway, an area surrounding a flow pathway, and an area desired to be fractured. The placing of the second composition in the subterranean formation can be any suitable placing and can include any suitable contacting between the subterranean formation and the second composition. The placing of the second composition in the subterranean formation can include at least partially depositing the second composition in a fracture, flow pathway, or area surrounding the same. In some embodiments, the method includes obtaining or providing the second composition. The obtaining or providing of the second composition can occur at any suitable time and at any suitable location. The obtaining or providing of the second composition can occur above the surface. The obtaining or providing of the second composition can occur in the subterranean formation (e.g., downhole).

The method can include hydraulic fracturing, such as to generate a fracture or flow pathway. The placing of the first or second composition in the subterranean formation and the hydraulic fracturing can occur at any time with respect to one another; for example, the hydraulic fracturing can occur at least one of before, during, and after placing at least one of the first and second composition in the subterranean formation. In some embodiments, the first composition is at least one of a pre-pad fluid (e.g., fluid that is substantially free of proppant and optionally includes mid- to low-strength acid) and a pad fluid (e.g., fluid that is substantially free of proppant, such as for beginning to break into an area and initiate fractures to produce sufficient penetration and width to allow proppant-laden later stages to enter). In various embodiments, the second composition is at least one of a pad fluid and a proppant slurry (e.g., viscous fluid including proppant suspension). The method can include fracturing the subterranean formation using the second composition. In some embodiments, the method also includes fracturing the subterranean formation using the first composition, such as before placing the second composition in the subterranean formation (e.g., downhole).

The method can include performing a stimulation treatment at least one of before, during, and after placing the first or second composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the first or second composition is placed in or contacted to, or the composition is placed in or contacted to an area surrounding the generated fracture or flow pathway.

In various embodiments, the first composition is a pre-pad fluid and the second composition is a pad fluid. In various embodiments, the first composition is a pre-pad fluid and the second composition is a proppant slurry. In various embodiments, the first composition is a pre-pad fluid and the second composition is a pad fluid. In various embodiments, the first composition is a pad fluid and the second composition is a pad fluid (e.g., the first composition and the second composition are used at different stages of injecting the pad fluid). In various embodiments, the first composition is a pad fluid and the second composition is a proppant slurry.

The first composition and the second composition can include any suitable carrier fluid, in any suitable proportion. As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more. In some embodiments, the first composition and the second composition are aqueous compositions.

Penetrating-Aid Surfactant.

The first composition or the second composition includes a penetrating-aid surfactant, such that the placing of the first composition and the second composition in the subterranean formation is sequential placing of the penetrating-aid surfactant and the pore-declogging surfactant in the subterranean formation, in any order. The penetrating-aid surfactant can be any surfactant that at least one of increases permeation of the first or second composition (e.g., the composition that includes the penetrating aid surfactant, which applies to all instances of first or second composition in this sentence), increases wetting of the first or second composition in the subterranean formation, reduces friction between the first or second composition and the subterranean formation, and emulsifies or solubilizes the first or second composition in at least one of hydrocarbon liquids and aqueous liquids present in the subterranean formation. The penetrating-aid surfactant can have modulated concentration depending on the porosity of the subterranean formation. In various embodiments, the penetrating-aid surfactant can assist in at least one of the immersion, suspension, and the wetting of proppant. The penetrating-aid surfactant can be an anionic surfactant, a cationic surfactant, a zwitterionic surfactant, or a nonionic surfactant. Any suitable proportion of the first or second composition can be the penetrating-aid surfactant, such as about 0.01 wt % to about 100 wt %, about 0.01 wt % to about 50 wt %, or about 0.1 wt % to about 20 wt %, or about 0.01 wt % or less, or about 0.1 wt %, 1, 2, 3, 4, 5, 6, 8, 10, 12, 14, 16, 18, 20, 25, 30, 35, 40, 45 wt %, or about 50 wt % or more.

In some embodiments, the penetrating-aid surfactant is an ethyne substituted at the 1- and 2-positions with a substituted or unsubstituted hydroxy($C_1$-$C_{20}$)hydrocarbyl. The penetrating-aid surfactant can be substantially symmetric across the ethyne group. The penetrating-aid surfactant can be an ethyne substituted at the 1- and 2-positions with a hydroxy($C_1$-$C_{20}$)alkyl. The penetrating-aid surfactant can be 2,4,7,9-tetramethyldec-5-yne-4,7-diol, having the structure:

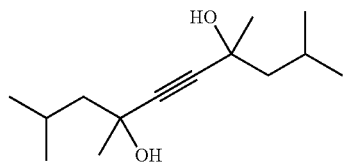

The penetrating-aid surfactant can have the structure (($C_5$-$C_{50}$)hydrocarbyl)-(O—($C_2$-$C_3$)alkyl)$_n$-R$^1$, (($C_5$-$C_{50}$) hydrocarbyl)-O—S(O)$_2$(O—($C_2$-$C_3$)alkyl)$_n$-R$^1$, or a (($C_5$-$C_{50}$)hydrocarbyl)-O—($C_2$-$C_3$)alkyl)$_n$-O—S(O)$_2$—OH or a salt thereof. Each ($C_2$-$C_3$)alkyl can be independently selected and can be substituted or unsubstituted. The ($C_5$-$C_{50}$)hydrocarbyl can be substituted or unsubstituted. The ($C_5$-$C_{50}$)hydrocarbyl can be a ($C_5$-$C_{50}$)alkyl. The ($C_5$-$C_{50}$) hydrocarbyl can be a substituted or unsubstituted ($C_1$-$C_{24}$) hydrocarbyl-phenyl-. The ($C_5$-$C_{50}$)hydrocarbyl can be a ($C_1$-$C_{24}$)alkyl-phenyl-. The ($C_1$-$C_{24}$) alkyl can be branched or straight-chain. The variable R$^1$ can be —H or —OH. The variable n can be about 1 to about 1,000, about 1 to about 100, or about 1, 2, 3, 4, 5, 6, 7, 8, 9, 10, 12, 14, 16, 18, 20, 25, 30, 35, 40, 45, 50, 60, 70, 80, 90, 100, 150, 200, 250, 500, 750, or about 1,000 or more.

In some embodiments, the penetrating-aid surfactant has the structure:

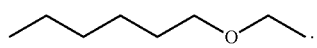

The penetrating-aid surfactant can have the structure:

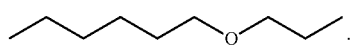

The penetrating-aid surfactant can have the structure:

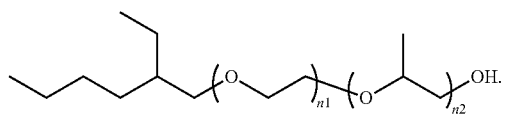

The variables n1 and n2 can be each independently about 1 to about 1,000, or about 1 to about 100 (e.g., about 1, 2, 3, 4, 5, 6, 7, 8, 9, 10, 12, 14, 16, 18, 20, 25, 30, 35, 40, 45, 50, 60, 70, 80, 90, 100, 150, 200, 250, 500, 750, or about 1,000 or more), wherein n1+n2 is 1,000 or less, or about 100 or less (e.g., about 1, 2, 3, 4, 5, 6, 7, 8, 9, 10, 12, 14, 16, 18, 20, 25, 30, 35, 40, 45, 50, 60, 70, 80, 90, 100, 150, 200, 250, 500, 750, or about 1,000).

The penetrating-aid surfactant can have the structure:

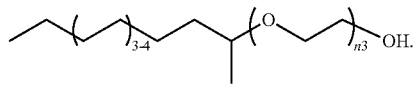

The variable n3 can be about 1 to about 1,000, about 1 to about 100, or about 1, 2, 3, 4, 5, 6, 7, 8, 9, 10, 12, 14, 16, 18, 20, 25, 30, 35, 40, 45, 50, 60, 70, 80, 90, 100, 150, 200, 250, 500, 750, or about 1,000 or more.

The penetrating-aid surfactant can have the structure:

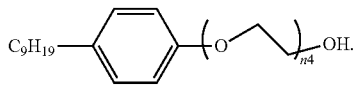

The variable n4 can be about 1 to about 1,000, about 1 to about 100, or about 1, 2, 3, 4, 5, 6, 7, 8, 9, 10, 12, 14, 16, 18, 20, 25, 30, 35, 40, 45, 50, 60, 70, 80, 90, 100, 150, 200, 250, 500, 750, or about 1,000 or more.

The penetrating-aid surfactant can be a perfluoroalkyl betaine. The penetrating-aid surfactant can have the structure perfluoro($C_1$-$C_{20}$)alkyl-($C_0$-$C_{20}$)hydrocarbyl-S(O)$_2$NH—($C_1$-$C_{20}$)hydrocarbyl-N$^+$(($C_1$-$C_{20}$)alkyl)$_2$-($C_0$-$C_{20}$)hydrocarbyl-C(O)O$^-$, or a salt thereof. Each ($C_0$-$C_{20}$)hydrocarbyl can be substituted or unsubstituted and is independently selected. The ($C_1$-$C_{20}$)hydrocarbyl can be substituted or unsubstituted. Each ($C_1$-$C_{20}$) alkyl can be independently selected and is substituted or unsubstituted.

The penetrating-aid surfactant can have the structure perfluoro($C_1$-$C_{20}$)alkyl-($C_0$-$C_{10}$)alkyl-S(O)$_2$NH—($C_1$-$C_{20}$)alkyl-N$^+$(($C_1$-$C_5$)alkyl)$_2$-($C_0$-$C_{20}$)alkyl-C(O)O$^-$, or a salt thereof. Each ($C_0$-$C_{20}$)hydrocarbyl can be independently selected. Each ($C_1$-$C_{20}$) alkyl can be independently selected. The penetrating-aid surfactant can be 2-(dimethyl(3-((3,3,4,4,5,5,6,6,7,7,8,8-tridecafluorooctyl)sulfonamido)propyl)ammonio)acetate, having the structure:

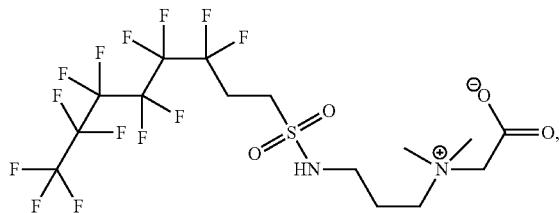 [SMILES: C[N+](C)(CCCNS(=O)(=O)CCC(F)(F)C(F)(F)C(F)(F)C(F)(F)C(F)(F)C(F)(F)F)CC(=O)[O-]]

or a salt thereof.

The penetrating-aid surfactant can be a alkylbenzene sulfonate salt, such as a calcium ($C_5$-$C_{50}$)alkylbenzene sulfonate. The penetrating-aid surfactant can be alkylphenol ethoxylate, such as a ($C_1$-$C_{50}$)alkylphenol ethoxylate. The penetrating-aid surfactant can be a hydrocarbylalcohol ethoxylate, such as a ($C_1$-$C_{50}$)hydrocarbylalcohol ethoxylate. The penetrating-aid surfactant can be a fatty acid ethoxylate, such as a ($C_5$-$C_{50}$)fatty acid ethoxylate. The penetrating-aid surfactant can be a alkyl mono- or poly-glycoside, such as a ($C_1$-$C_{50}$)alkyl mono- or poly-glycoside. The penetrating-aid surfactant can be a sorbitan ester of a fatty acid, such as a sorbitan ester of a ($C_5$-$C_{50}$)fatty acid. As used herein, "ethyoxylate" can refer to mono or poly ethoxylation.

Pore-Declogging Surfactant.

The first composition or second composition includes a pore-declogging surfactant, such that the placing of the first composition and the second composition in the subterranean formation is sequential placing of the penetrating-aid surfactant and the pore-declogging surfactant, in any order. The pore-declogging surfactant can be any suitable surfactant that at least one of increases wetting of hydrocarbons in the subterranean formation, increases flowback of hydrocarbons through the subterranean formation, demulsifies hydrocarbons with the first or second composition (e.g., the composition that includes the pore-declogging surfactant), and unclogs viscous gel residue from pores of the subterranean formation. In some embodiments, the pore-declogging surfactant can be used before or after a fracturing operation to at least one of remove filter cake and remove polymer residue. The pore-declogging surfactant can be an anionic surfactant, a cationic surfactant, a zwitterionic surfactant, or a nonionic surfactant. Any suitable proportion of the first or second composition can be the pore-declogging surfactant, such as about 0.01 wt % to about 100 wt %, about 0.01 wt % to about 50 wt %, or about 0.1 wt % to about 20 wt %, or about 0.01 wt % or less, or about 0.1 wt %, 1, 2, 3, 4, 5, 6, 8, 10, 12, 14, 16, 18, 20, 25, 30, 35, 40, 45 wt %, or about 50 wt % or more.

The pore-declogging surfactant can have the structure:

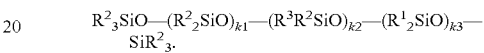

At each occurrence, $R^2$ can be independently substituted or unsubstituted ($C_1$-$C_5$)hydrocarbyl. At each occurrence, $R^2$ can be independently ($C_1$-$C_5$)alkyl. The variable $R^2$ can be methyl. At each occurrence, $R^3$ can be independently substituted or unsubstituted ($C_6$-$C_{50}$)hydrocarbyl. At each occurrence, $R^3$ can be independently ($C_6$-$C_{50}$)alkyl. The variable $R^3$ can be —(CH$_2$)$_{17}$—CH$_3$ (steryl). The variables k1, k2, and k3 can be each independently about 0 to about 10,000, about 0 to about 1,000, or about 0, 1, 2, 3, 4, 5, 6, 8, 10, 12, 14, 16, 18, 20, 25, 30, 35, 40, 45, 50, 60, 70, 80, 90, 100, 150, 200, 250, 500, 750, 1,000, 1,500, 2,000, 2,500, 5,000, 7,500, or about 10,000 or more. The sum of k2+k3 can be at least about 1 (e.g., 1, 2, 3, 4, 5, 6, 8, 10, 12, 14, 16, 18, 20, 25, 30, 35, 40, 45, 50, 60, 70, 80, 90, 100, 150, 200, 250, 500, 750, 1,000, 1,500, 2,000, 2,500, 5,000, 7,500, or about 10,000 or more). The pore-declogging surfactant can be stearyl dimethicone.

The pore-declogging surfactant can be a substituted or unsubstituted phenyl($C_0$-$C_{20}$)hydrocarbylsulfonic acid or a salt thereof, wherein the ($C_0$-$C_{20}$)hydrocarbyl is substituted or unsubstituted. The pore-declogging surfactant can be a substituted or unsubstituted phenylsulfonic acid or a salt thereof. The pore-declogging surfactant can be a ($C_5$-$C_{50}$) hydrocarbyl-substituted xylenylsulfonic acid or a salt thereof, wherein the ($C_5$-$C_{50}$)hydrocarbyl is substituted or unsubstituted. The pore-declogging surfactant can be a ($C_5$-$C_{50}$)alkyl-substituted xylenylsulfonic acid or a salt thereof.

The pore-declogging surfactant can be an alkyl polyoxyethylene glycol, such as a ($C_1$-$C_{50}$)alkyl polyoxyethylene ($C_1$-$C_{10}$)glycol.

Surfactants.

The penetrating-aid surfactant and the pore-declogging surfactant can be any suitable surfactants, so long as the penetrating-aid surfactant performs as described herein and the pore-declogging surfactant performs as described herein. The penetrating-aid surfactant is a different surfactant than the pore-declogging surfactant. In some embodiments, at least one of the penetrating-aid surfactant and the pore-declogging surfactant is an anionic surfactant, a cationic surfactant, a zwitterionic surfactant, or a nonionic surfactant. In various embodiments, at least one of the first or second composition includes any suitable one or more surfactant in addition to the penetrating-aid surfactant and the pore-declogging surfactant. In various embodiments, at least one of the penetrating-aid surfactant, the pore-declogging surfactant, and an additional surfactant in the first or second composition, can be any surfactant described in this section. The one or more additional surfactants can form any suitable proportion of the first or second composition, such as about 0.01 wt % to about 50 wt %, or about 0.1 wt % to about 20 wt %, or about 0.01 wt % or less, or about 0.1 wt %, 1, 2, 3, 4, 5, 6, 8, 10, 12, 14, 16, 18, 20, 25, 30, 35, 40, 45 wt %, or about 50 wt % or more. Optionally, at least one of the first composition and the second composition can be free of any one or more surfactants described herein.

In some embodiments, the surfactant can be amine-functional, such as an amine ethoxylate or an amine ethoxylated quaternary salt, such as tallow diamine and tallow triamine exthoxylates and quaternary salts. The surfactant can be can be an ethoxylated $C_{12}$-$C_{22}$ diamine, an ethoxylated $C_{12}$-$C_{22}$ triamine, ethoxylated $C_{12}$-$C_{22}$ tetraamine, ethoxylated $C_{12}$-$C_{22}$ diamine methylchloride quaternary salt, ethoxylated $C_{12}$-$C_{22}$ triamine methylchloride quaternary salt, ethoxylated $C_{12}$-$C_{22}$ tetraamine methylchloride quaternary salt, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine dodecylbenzenesulfonic acid (DDBSA) salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quaternary salt, heptamethylated $C_{12}$-$C_{22}$ diamine quaternary salt, nonamethylated $C_{12}$-$C_{22}$ diamine quaternary salt, and combinations thereof.

The surfactant can have the structure:

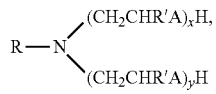

wherein R is a $C_{12}$-$C_{22}$ aliphatic hydrocarbon; R' is independently selected from hydrogen or $C_1$-$C_3$ alkyl group; A is NH or O, and x+y has a value greater than or equal to one but also less than or equal to three. The R group can be a non-cyclic aliphatic. In some embodiments, the R group contains at least one degree of unsaturation (e.g., at least one carbon-carbon double bond). In other embodiments, the R group can be a commercially recognized mixture of aliphatic hydrocarbons such as soya, which is a mixture of $C_{14}$-$C_{20}$ hydrocarbons; tallow, which is a mixture of $C_{16}$-$C_{20}$, aliphatic hydrocarbons; or tall oil, which is a mixture of $C_{14}$-$C_{18}$ aliphatic hydrocarbons. In some embodiments, the A group is NH, and the value of x+y is two; in some examples, x is one. In some embodiments, the A group is O, and the value of x+y is two; in some examples, x is one. Examples of commercially available amine surfactants are TER 2168 Series™ available from Champion Chemicals located in Fresno, Tex.; Ethomeen® T/12, a diethoxylated tallow amine; Ethomeen® S/12, a diethoxylated soya amine; Duomeen® O, a N-oleyl-1,3-diaminopropane; and Duomeen® T, an N-tallow-1,3-diaminopropane, all of which are available from Akzo Nobel.

In some embodiments, the surfactant can be a tertiary alkyl amine ethoxylate (a cationic surfactant). Triton® RW-100 surfactant (e.g., x and y=10 moles of ethylene oxide) and Triton® RW-150 surfactant (x and y=15 moles of ethylene oxide) are examples of tertiary alkyl amine ethoxylates that can be purchased from Dow Chemical Company.

In some embodiments, the surfactant can be used as a combination of an amphoteric surfactant and an anionic or cationic surfactant. The amphoteric surfactant can be lauryl amine oxide, a mixture of lauryl amine oxide and myristyl amine oxide (e.g., a lauryl/myristyl amine oxide), cocoamine oxide, lauryl betaine, oleyl betaine, or combinations thereof. The cationic surfactant can be cocoalkyltriethyl ammonium chloride, hexadecyltrimethyl ammonium chloride, or combinations thereof (e.g., 50:50 mixture by weight of cocoalkyltriethylammonium chloride and the hexadecyltrimethyl ammonium chloride).

In some embodiments, the surfactant is a nonionic surfactant, such as an alcohol oxylalkylate, an alkyl phenol oxylalkylates, a nonionic ester such as a sorbitan esters and an alkoxylates of a sorbitan ester. Examples of nonionic surfactants include castor oil alkoxylates, fatty acid alkoxylates, lauryl alcohol alkoxylates, nonylphenol alkoxylates, octylphenol alkoxylates, tridecyl alcohol alkoxylates, POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan iso stearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitantristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate, POE-23 lauryl alcohol, POE-20 nonylphenyl ether. Other applicable nonionic surfactants are esters such as sorbitan monooleate.

Surfactants can act as emulsion stabilizers. In some examples, an emulsifying surfactant is ionic to give charge stabilization or has long groups for steric stability in water, such as cationic surfactants and anionic surfactants. Examples of emulsifying surfactants can be hexahydro-1,3,5-tris(2-hydroxyethyl)triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenzene sulfonic acid, branched dodecylbenzene sulfonic acid, fatty acid sulfonate potassium salt, phosphate esters, POE-1 ammonium lauryl ether sulfate, POE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecyl benzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and sodium octyl sulfate.

Other Components.

The first or second composition, or a mixture including the first or second composition, can include any suitable additional component in any suitable proportion, such that the first or second composition, or mixture including either one of the same, can be used as described herein.

In some embodiments, the first or second composition includes one or more viscosifiers. The viscosifier can be any suitable viscosifier. The viscosifier can affect the viscosity of the first or second composition or a solvent that contacts the first or second composition at any suitable time and location. In some embodiments, the viscosifier provides an increased viscosity at least one of before injection into the subterranean formation, at the time of injection into the subterranean formation, during travel through a tubular disposed in a borehole, once the first or second composition reaches a particular subterranean location, or some period of time after the first or second composition reaches a particular subterranean location. In some embodiments, the viscosifier can be about 0.000,1 wt % to about 10 wt % of the first or second composition or a mixture including either one of the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the first or second composition or a mixture including either one of the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$) alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the first or second composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly$((C_1-C_{20})$alkenyl)-substituted mono- or poly-$(C_1-C_{20})$alkyl ether (e.g., pentaerythritol allyl ether), and a poly$(C_2-C_{20})$alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the first or second composition or a mixture including either one of the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the first or second composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the first or second composition or a mixture including either one of the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The first or second composition, or a mixture including the first or second composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2-C_{40}$ fatty acid $C_1-C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the first or second composition, or a mixture including either one of the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The first or second composition or a mixture including either one of the same can include any suitable downhole fluid. The first or second composition can be combined with any suitable downhole fluid before, during, or after the placement of the first or second composition in the subterranean formation or the contacting of the first or second composition and the subterranean material. In some examples, the first or second composition is combined with a downhole fluid above the surface, and then the combined composition is placed in a subterranean formation or contacted with a subterranean material. In another example, the first or second composition is injected into a subterranean formation to combine with a downhole fluid, and the combined composition is contacted with a subterranean material or is considered to be placed in the subterranean formation. The placement of the first or second composition in the subterranean formation can include contacting the subterranean material and the mixture including the first or second composition. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the first or second composition, or a mixture including the either one of same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, cross-linking agents, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. Any suitable proportion of the first or second composition or mixture including the first or second composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %.

In various embodiments, the first or second composition or mixture including either one of the same can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The first or second composition or mixture including the same can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the first or second composition described herein in a subterranean formation, or that can perform or be generated by performance of a method for using the first or second composition described herein.

In various embodiments, the system can include a tubular disposed in a subterranean formation. The subterranean formation includes a penetrating-aid surfactant. The system can also include a pump configured to pump a pore-declogging surfactant into the subterranean formation through the tubular.

In various embodiments, the system can include a tubular disposed in a subterranean formation. The subterranean formation includes a pore-declogging surfactant. The system can also include a pump configured to pump a penetrating-aid surfactant into the subterranean formation through the tubular.

In various embodiments, the system can include a tubular disposed in a subterranean formation. The subterranean formation includes a first composition including a penetrating-aid surfactant or a pore-declogging surfactant. The system can also include a pump configured to pump a second composition into the subterranean formation through the tubular. The second composition includes a penetrating-aid surfactant or a pore-declogging surfactant.

In various embodiments, the system can include a tubular disposed in a fractured subterranean formation. The fractured subterranean formation can include (e.g., can have been fractured by) a first composition that can be at least one of a pre-pad fluid and a pad fluid. The first composition can include a penetrating-aid surfactant, such as any penetrating-aid surfactant described herein. The system can also include a pump configured to pump a second composition into the subterranean formation through the tubular. The second composition can be at least one of a pad fluid and a proppant slurry. The second composition can include a pore-declogging surfactant, such as any pre-declogging surfactant described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the first or second composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the first or second composition to the high pressure pump. In such embodiments, the low pressure pump can "step up" the pressure of the first or second composition before it reaches the high pressure pump.

In some embodiments, the systems or apparatuses described herein can further include a mixing tank that is upstream of the pump and in which the first or second composition is formulated. In various embodiments, the pump (e.g., a low pressure pump, a high pressure pump, or a combination thereof) can convey the first or second composition from the mixing tank or other source of the first or second composition to the tubular. In other embodiments, however, the first or second composition can be formulated offsite and transported to a worksite, in which case the first or second composition can be introduced to the tubular via the pump directly from its shipping container (e.g., a truck, a railcar, a barge, or the like) or from a transport pipeline. In either case, the first or second composition can be drawn into the pump, elevated to an appropriate pressure, and then introduced into the tubular for delivery to the subterranean formation.

FIG. 1 shows an illustrative schematic of systems and apparatuses that can deliver embodiments of the first or second compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the first or second composition can be formulated. The first or second composition can be conveyed via line 12 to wellhead 14, where the composition enters tubular 16, with tubular 16 extending from wellhead 14 into subterranean formation 18. Upon being ejected from tubular 16, the first or second composition can subsequently penetrate into subterranean formation 18. Pump 20 can be configured to raise the pressure of the first or second composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the first or second composition can, in some embodiments, flow back to wellhead 14 and exit subterranean formation 18. The first or second composition that flows back can be substantially diminished in the concentration of penetrating-aid surfactant or pore-declogging surfactant therein. In some embodiments, the first or second composition that has flowed back to wellhead 14 can subsequently be recovered, and in some examples reformulated, and recirculated to subterranean formation 18.

It is also to be recognized that the disclosed first or second composition can also directly or indirectly affect the various downhole or subterranean equipment and tools that can come into contact with the first or second composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

EXAMPLES

Various embodiments of the present invention can be better understood by reference to the following Examples which are offered by way of illustration. The present invention is not limited to the Examples given herein.

Example 1. Emulsion Tendency

Equal volumes of 1000 ppm surfactant solution and crude oil were combined in a quartz tube (note that condensate may also be used). The tube was shaken with a mechanical shaker. A high speed blender may also be used. The tube was immediately placed in a dynamic scattering device such as LumiSizer or Turbiscan. The data was collected for two hours. The phase separation rates or instability index of emulsions were then calculated from the slopes of the curves by $\Delta$Transmission or BackScattering=f(Time). Those values are chosen as a reference to compare the efficiency of surfactants.

Figure 2:
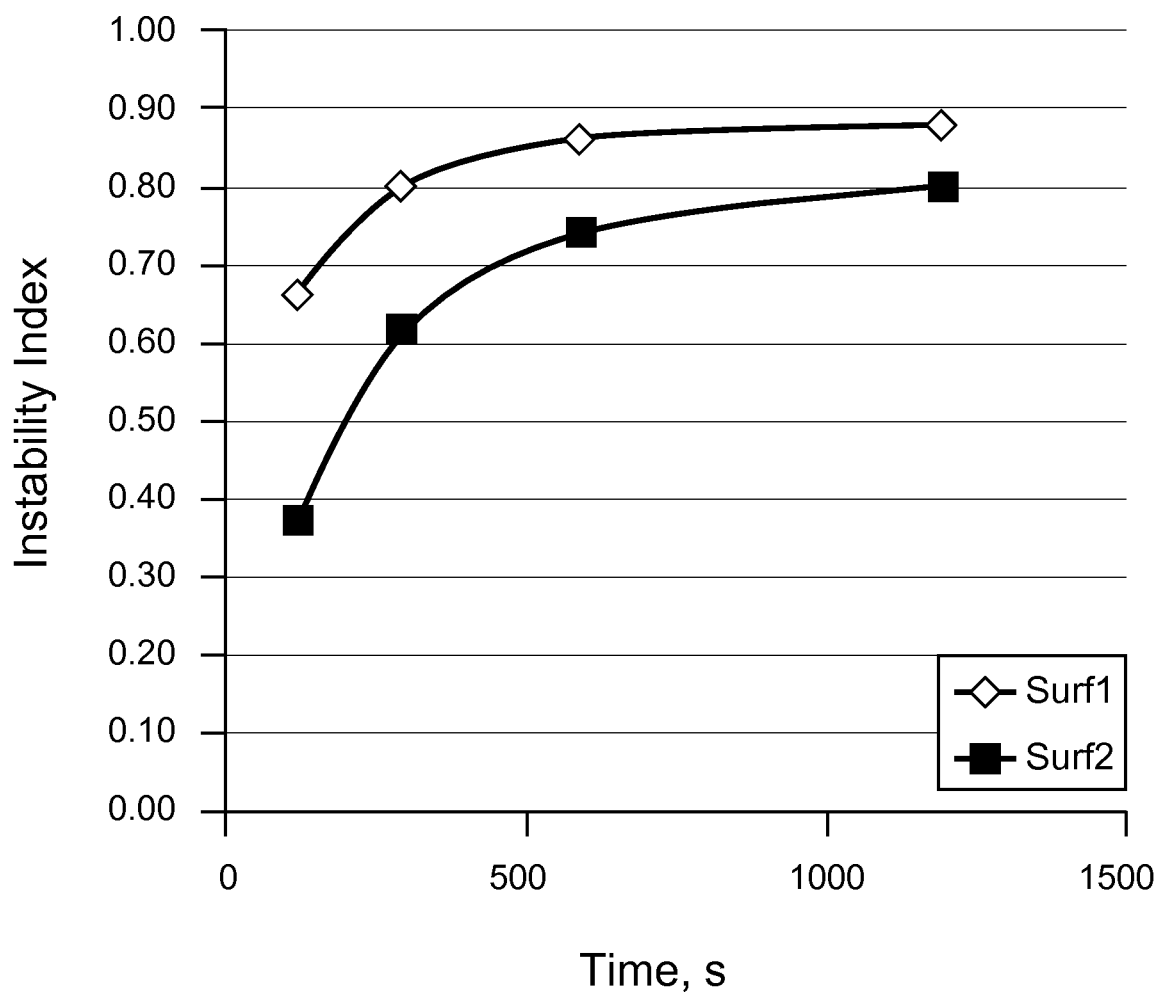
FIG. 2 compares the phase separation rates of a non-emulsifying surfactant and a weakly emulsifying one, in accordance with various embodiments.

FIG. 2 compares the phase separation rates of a non-emulsifying surfactant (surf 1-a $C_{12}$-$C_{16}$ linear ethoxylated alcohol, CAS 68551-12-2, e.g., a pore-declogging surfactant) and a weakly emulsifying one (surf 2-a linear ethoxylated $C_{12}$-$C_{14}$ fatty alcohol sulfate, CAS 68891-38-3, a fatty alcohol that is ethoxylated wherein the ethoxylate is in turn bonded to a sulfate, e.g., a penetrating-aid surfactant).

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
sequentially placing in the subterranean formation a penetrating-aid surfactant and a pore-declogging surfactant.

Embodiment 2 provides the method of Embodiment 1, wherein a first composition comprises either the penetrating-aid surfactant or the pore-declogging surfactant, and a second composition comprises the other of the penetrating-aid surfactant and the pore-declogging surfactant.

Embodiment 3 provides the method of Embodiment 2, wherein the first composition is at least one of a pre-pad fluid and a pad fluid, and wherein the second composition is at least one of a pad fluid and a proppant slurry.

Embodiment 4 provides the method of any one of Embodiments 2-3, further comprising fracturing the subterranean formation with the second composition.

Embodiment 5 provides the method of any one of Embodiments 2-4, wherein the method further comprises obtaining or providing the first composition, wherein the obtaining or providing of the first composition occurs above-surface.

Embodiment 6 provides the method of any one of Embodiments 2-5, wherein the method further comprises obtaining or providing the first composition, wherein the obtaining or providing of the first composition occurs in the subterranean formation.

Embodiment 7 provides the method of any one of Embodiments 2-6, wherein the method further comprises obtaining or providing the second composition, wherein the obtaining or providing of the second composition occurs above-surface.

Embodiment 8 provides the method of any one of Embodiments 2-7, wherein the method further comprises obtaining or providing the second composition, wherein the obtaining or providing of the second composition occurs in the subterranean formation.

Embodiment 9 provides the method of any one of Embodiments 2-8, further comprising fracturing the subterranean formation with the first composition.

Embodiment 10 provides the method of Embodiment 9, wherein the fracturing of the subterranean formation with the first composition is performed prior to the placing of the second composition in the subterranean formation.

Embodiment 11 provides the method of any one of Embodiments 2-10, wherein the first composition is a pre-pad fluid and the second composition is a pad fluid.

Embodiment 12 provides the method of any one of Embodiments 2-11, wherein the first composition is a pad fluid and the second composition is a pad fluid.

Embodiment 13 provides the method of any one of Embodiments 2-12, wherein the first composition is at least one of a pre-pad fluid and a pad fluid, and the second composition is a proppant slurry.

Embodiment 14 provides the method of any one of Embodiments 2-13, wherein about 0.01 wt % to about 100 wt % of the first or second composition is the penetrating-aid surfactant.

Embodiment 15 provides the method of any one of Embodiments 2-14, wherein about 0.1 wt % to about 20 wt % of the first or second composition is the penetrating-aid surfactant.

Embodiment 16 provides the method of any one of Embodiments 2-15, wherein the penetrating-aid surfactant at least one of increases permeation of the first or second composition, increases wetting of the first or second composition in the subterranean formation, reduces friction between the first or second composition and the subterranean formation, and emulsifies or solubilizes the first or second composition in at least one of hydrocarbon liquids and aqueous liquids present in the subterranean formation.

Embodiment 17 provides the method of any one of Embodiments 1-16, wherein the penetrating-aid surfactant is an anionic surfactant, a cationic surfactant, a zwitterionic surfactant, or a nonionic surfactant.

Embodiment 18 provides the method of any one of Embodiments 1-17, wherein the penetrating-aid surfactant is a nonionic surfactant.

Embodiment 19 provides the method of any one of Embodiments 1-18, wherein the penetrating-aid surfactant is an ethyne substituted at the 1- and 2-positions with a substituted or unsubstituted hydroxy($C_1$-$C_{20}$)hydrocarbyl.

Embodiment 20 provides the method of Embodiment 19, wherein the penetrating-aid surfactant is substantially symmetric across the ethyne group.

Embodiment 21 provides the method of any one of Embodiments 1-20, wherein the penetrating-aid surfactant is an ethyne substituted at the 1- and 2-positions with a hydroxy($C_1$-$C_{20}$)alkyl.

Embodiment 22 provides the method of any one of Embodiments 1-21, wherein the penetrating-aid surfactant is 2,4,7,9-tetramethyldec-5-yne-4,7-diol, having the structure:

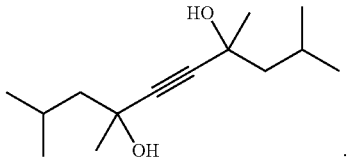 [SMILES: CC(C)CC(C)(O)C#CC(C)(O)CC(C)C]

Embodiment 23 provides the method of any one of Embodiments 1-22, wherein the penetrating-aid surfactant has the structure $((C_5\text{-}C_{50})\text{hydrocarbyl})\text{-}(O\text{—}(C_2\text{-}C_3)\text{alkyl})_n\text{-}R^1$, $((C_5\text{-}C_{50})\text{hydrocarbyl})\text{-}O\text{—}S(O)_2\text{—}(O\text{—}(C_2\text{-}C_3)\text{alkyl})_n\text{-}R^1$, or a $((C_5\text{-}C_{50})\text{hydrocarbyl})\text{-}O\text{—}(C_2\text{-}C_3)\text{alkyl})_n\text{-}O\text{—}S(O)_2\text{—}OH$ or a salt thereof, wherein each $(C_2$-$C_3)$alkyl is independently selected and is substituted or unsubstituted,
the $(C_5$-$C_{50})$hydrocarbyl is substituted or unsubstituted,
$R^1$ is —H or —OH, and
n is about 1 to about 1,000.

Embodiment 24 provides the method of Embodiment 23, wherein the $(C_5$-$C_{50})$hydrocarbyl is a $(C_5$-$C_{50})$alkyl.

Embodiment 25 provides the method of any one of Embodiments 23-24, wherein n is about 1 to about 100.

Embodiment 26 provides the method of any one of Embodiments 1-25, wherein the penetrating-aid surfactant has the structure:

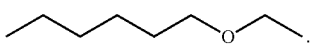

Embodiment 27 provides the method of any one of Embodiments 1-26, wherein the penetrating-aid surfactant has the structure:

Embodiment 28 provides the method of any one of Embodiments 1-27, wherein the penetrating-aid surfactant has the structure:

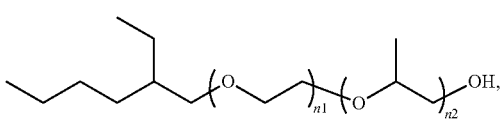

wherein n1 and n2 are each independently about 1 to about 1,000, wherein n1+n2 is 1,000 or less.

Embodiment 29 provides the method of any one of Embodiments 1-28, wherein the penetrating-aid surfactant has the structure:

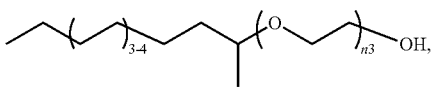

wherein n3 is about 1 to about 1,000.

Embodiment 30 provides the method of Embodiment 20, wherein the $(C_5$-$C_{50})$hydrocarbyl is a substituted or unsubstituted $(C_1$-$C_{24})$hydrocarbyl-phenyl-.

Embodiment 31 provides the method of any one of Embodiments 20-21, wherein the $(C_5$-$C_{50})$hydrocarbyl is a $(C_1$-$C_{24})$alkyl-phenyl-.

Embodiment 32 provides the method of Embodiment 31, wherein the $(C_1$-$C_{24})$alkyl is branched.

Embodiment 33 provides the method of any one of Embodiments 1-32, wherein the penetrating-aid surfactant has the structure:

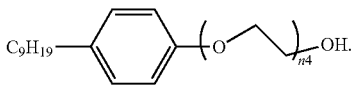

wherein n4 is about 1 to about 1,000.

Embodiment 34 provides the method of any one of Embodiments 1-33, wherein the penetrating-aid surfactant is a perfluoroalkyl betaine.

Embodiment 35 provides the method of any one of Embodiments 1-34, wherein the penetrating-aid surfactant has the structure perfluoro$(C_1$-$C_{20})$alkyl-$(C_0$-$C_{20})$hydrocarbyl-S(O)$_2$NH—$(C_1$-$C_{20})$hydrocarbyl-N$^+$($(C_1$-$C_{20})$alkyl)$_2$-$(C_0$-$C_{20})$hydrocarbyl-C(O)O$^-$, or a salt thereof, wherein
each $(C_0$-$C_{20})$hydrocarbyl is substituted or unsubstituted and is independently selected,
the $(C_1$-$C_{20})$hydrocarbyl is substituted or unsubstituted, and
each $(C_1$-$C_{20})$alkyl is independently selected and is substituted or unsubstituted.

Embodiment 36 provides the method of any one of Embodiments 1-35, wherein the penetrating-aid surfactant has the structure perfluoro$(C_1$-$C_{20})$alkyl-$(C_0$-$C_{10})$alkyl-S(O)$_2$NH—$(C_1$-$C_{20})$alkyl-N$^+$($(C_1$-$C_5)$alkyl)$_2$-$(C_0$-$C_{20})$alkyl-C(O)O$^-$, or a salt thereof, wherein
each $(C_0$-$C_{20})$hydrocarbyl is independently selected, and
each $(C_1$-$C_{20})$alkyl is independently selected.

Embodiment 37 provides the method of any one of Embodiments 1-36, wherein the penetrating-aid surfactant is 2-(dimethyl(3-((3,3,4,4,5,5,6,6,7,7,8,8,8-tridecafluorooctyl)sulfonamido)propyl)ammonio)acetate, having the structure:

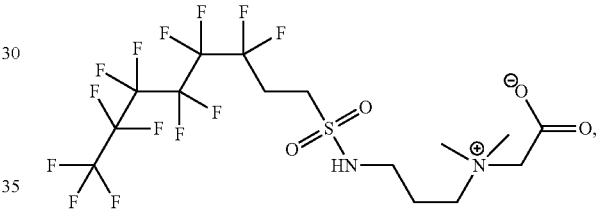

or a salt thereof.

Embodiment 38 provides the method of any one of Embodiments 1-37, wherein the penetrating-aid surfactant is at least one of a alkylbenzene sulfonate salt, a alkylphenol ethoxylate, a hydrocarbylalcohol ethoxylate, a fatty acid ethoxylate, a alkyl mono- or poly-glycoside, and a sorbitan ester of a fatty acid.

Embodiment 39 provides the method of any one of Embodiments 1-38, wherein the penetrating-aid surfactant is at least one of a $(C_5$-$C_{50})$alkylbenzene sulfonate salt, a $(C_1$-$C_{50})$alkylphenol ethoxylate, a $(C_1$-$C_{50})$hydrocarbylalcohol ethoxylate, a $(C_5$-$C_{50})$fatty acid ethoxylate, a $(C_1$-$C_{50})$alkyl mono- or poly-glycoside, and a sorbitan ester of a $(C_5$-$C_{50})$fatty acid.

Embodiment 40 provides the method of any one of Embodiments 1-39, wherein the penetrating-aid surfactant is calcium dodecylbenzene sulfonate.

Embodiment 41 provides the method of any one of Embodiments 2-40, wherein about 0.01 wt % to about 100 wt % of the second composition is the pore-declogging surfactant.

Embodiment 42 provides the method of any one of Embodiments 2-41, wherein about 0.1 wt % to about 20 wt % of the first or second composition is the pore-declogging surfactant.

Embodiment 43 provides the method of any one of Embodiments 2-42, wherein the pore-declogging surfactant at least one of increases wetting of hydrocarbons in the subterranean formation, increases flowback of hydrocarbons through the subterranean formation, demulsifies hydrocarbons with the first or second composition, and unclogs viscous gel residue from pores of the subterranean formation.

Embodiment 44 provides the method of any one of Embodiments 1-43, wherein the pore-declogging surfactant is an anionic surfactant, a cationic surfactant, a zwitterionic surfactant, or a nonionic surfactant.

Embodiment 45 provides the method of any one of Embodiments 1-44, wherein the pore-declogging surfactant has the structure:

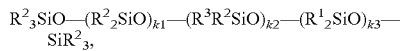

wherein
at each occurrence, $R^2$ is independently substituted or unsubstituted $(C_1-C_5)$hydrocarbyl,
at each occurrence, $R^3$ is independently substituted or unsubstituted $(C_6-C_{50})$hydrocarbyl, and
k1, k2, and k3 are each independently about 0 to about 10,000, wherein k2+k3 is at least about 1.

Embodiment 46 provides the method of Embodiment 45, wherein at each occurrence, $R^2$ is independently $(C_1-C_5)$ alkyl.

Embodiment 47 provides the method of any one of Embodiments 45-46, wherein $R^2$ is methyl.

Embodiment 48 provides the method of any one of Embodiments 45-47, wherein at each occurrence, $R^3$ is independently $(C_6-C_{50})$alkyl.

Embodiment 49 provides the method of any one of Embodiments 45-48, wherein $R^3$ is —$(CH_2)_{17}$—$CH_3$ (steryl).

Embodiment 50 provides the method of any one of Embodiments 45-49, wherein k1, k2, and k3 are each independently about 0 to about 1,000.

Embodiment 51 provides the method of any one of Embodiments 45-50, wherein the pore-declogging surfactant is stearyl dimethicone.

Embodiment 52 provides the method of any one of Embodiments 1-51, wherein the pore-declogging surfactant is a substituted or unsubstituted phenyl$(C_0-C_{20})$hydrocarbylsulfonic acid or a salt thereof, wherein the $(C_0-C_{20})$ hydrocarbyl is substituted or unsubstituted.

Embodiment 53 provides the method of any one of Embodiments 45-52, wherein the pore-declogging surfactant is a substituted or unsubstituted phenylsulfonic acid or a salt thereof.

Embodiment 54 provides the method of any one of Embodiments 45-53, wherein the pore-declogging surfactant is a $(C_5-C_{50})$hydrocarbyl-substituted xylenylsulfonic acid or a salt thereof, wherein the $(C_5-C_{50})$hydrocarbyl is substituted or unsubstituted.

Embodiment 55 provides the method of any one of Embodiments 45-54, wherein the pore-declogging surfactant is a $(C_5-C_{50})$alkyl-substituted xylenylsulfonic acid or a salt thereof.

Embodiment 56 provides the method of any one of Embodiments 1-55, wherein the pore-declogging surfactant is an alkyl polyoxyethylene glycol.

Embodiment 57 provides the method of any one of Embodiments 1-56, wherein the pore-declogging surfactant is a $(C_1-C_{50})$alkyl polyoxyethylene $(C_1-C_{10})$glycol.

Embodiment 58 provides the method of any one of Embodiments 2-57, wherein at least one of the first composition and the second composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 59 provides the method of any one of Embodiments 2-58, wherein the placing of the first or second composition in the subterranean formation comprises pumping the first or second composition through a tubular disposed in a wellbore and into the subterranean formation.

Embodiment 60 provides a system for performing the method of any one of Embodiments 2-59, the system comprising:
a tubular disposed in the subterranean formation; and
a pump configured to pump the first or second composition through the tubular.

Embodiment 61 provides a method of hydraulically fracturing a subterranean formation, the method comprising:
placing in the subterranean formation a first composition that is at least one of a pre-pad fluid and a pad fluid, the first composition comprising a penetrating-aid surfactant that is at least one of
an ethyne substituted at the 1- and 2-positions with a substituted or unsubstituted hydroxy$(C_1-C_{20})$hydrocarbyl,
a (($C_5-C_{50}$)hydrocarbyl)-(O—($C_2-C_3$)alkyl)$_n$-$R^1$, (($C_5-C_{50}$)hydrocarbyl)-O—S(O)$_2$—(O—($C_2-C_3$)alkyl)$_n$-$R^1$, or a (($C_5-C_{50}$)hydrocarbyl)-O—($C_2-C_3$)alkyl)$_n$-O—S(O)$_2$—OH or a salt thereof, wherein
each ($C_2-C_3$)alkyl is independently selected and is substituted or unsubstituted,
the ($C_5-C_{50}$)hydrocarbyl is substituted or unsubstituted,
$R^1$ is —H or —OH, and
n is about 1 to about 1,000,
a perfluoro($C_1-C_{20}$)alkyl-($C_0-C_{20}$)hydrocarbyl-S(O)$_2$NH—($C_1-C_{20}$)hydrocarbyl-N$^+$(($C_1-C_{20}$)alkyl)$_2$-($C_0-C_{20}$)hydrocarbyl-C(O)O$^-$, or a salt thereof, wherein
each ($C_0-C_{20}$)hydrocarbyl is substituted or unsubstituted and is independently selected,
the ($C_1-C_{20}$)hydrocarbyl is substituted or unsubstituted, and
each ($C_1-C_{20}$)alkyl is independently selected and is substituted or unsubstituted,
a ($C_5-C_{50}$)alkylbenzene sulfonate salt,
a ($C_1-C_{50}$)alkylphenol ethoxylate,
a ($C_1-C_{50}$)hydrocarbylalcohol ethoxylate,
a ($C_5-C_{50}$)fatty acid ethoxylate,
a ($C_1-C_{50}$)alkyl mono- or poly-glycoside, and
a sorbitan ester of a ($C_5-C_{50}$)fatty acid;
fracturing the subterranean formation with the first composition;

placing in the subterranean formation a second composition that is a proppant slurry, the second composition comprising a pore-declogging surfactant that is at least one of

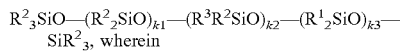
wherein at each occurrence, $R^2$ is independently substituted or unsubstituted $(C_1\text{-}C_5)$hydrocarbyl, at each occurrence, $R^3$ is independently substituted or unsubstituted $(C_6\text{-}C_{50})$hydrocarbyl, and k1, k2, and k3 are each independently about 0 to about 10,000, wherein k2+k3 is at least about 1, a substituted or unsubstituted phenyl$(C_0\text{-}C_{20})$hydrocarbylsulfonic acid or a salt thereof, wherein the $(C_0\text{-}C_{20})$hydrocarbyl is substituted or unsubstituted, and a $(C_1\text{-}C_{50})$alkyl polyoxyethylene $(C_1\text{-}C_{10})$glycol; and fracturing the subterranean formation with the second composition.

Embodiment 62 provides a system comprising:

a tubular disposed in a subterranean formation comprising a first composition comprising either a penetrating-aid surfactant or a pore-declogging surfactant; and a pump configured to pump a second composition into the subterranean formation through the tubular, wherein the second composition comprises the other of the penetrating-aid surfactant and the pore-declogging surfactant.

Embodiment 63 provides a system comprising:

a tubular disposed in a fractured subterranean formation comprising a first composition comprising either a penetrating-aid surfactant or a pore-declogging surfactant; and a pump configured to pump a second composition into the subterranean formation through the tubular, the second composition comprising the other of the penetrating-aid surfactant and the pore-declogging surfactant.

Embodiment 64 provides the method or system of any one or any combination of Embodiments 1-63 optionally configured such that all elements or options recited are available to use or select from.

What is claimed is:

1. A method of treating a subterranean formation, comprising:

sequentially placing in the subterranean formation a first composition comprising a penetrating-aid surfactant and a second composition comprising a pore-declogging surfactant, wherein the first composition is at least one of a pre-pad fluid and a pad fluid, and wherein the second composition is a proppant slurry;

wherein the penetrating-aid surfactant is 2,4,7,9-tetramethyldec-5-yne-4,7-diol, having the structure:

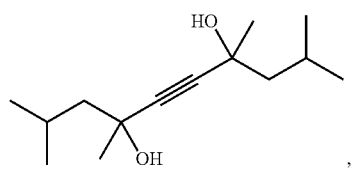 [SMILES: CC(C)CC(C)(O)C#CC(C)(O)CC(C)C]

and wherein the pore-declogging surfactant has the structure:

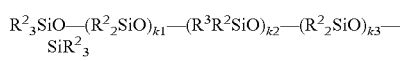

wherein:

at each occurrence, $R^2$ is independently substituted or unsubstituted $(C_1\text{-}C_5)$hydrocarbyl, at each occurrence, $R^3$ is independently substituted or unsubstituted $(C_6\text{-}C_{50})$hydrocarbyl, and k1, k2, and k3 are each independently about 0 to about 10,000, wherein k2+k3 is at least about 1, wherein the pore-declogging surfactant is stearyl dimethicone, a substituted or unsubstituted phenylsulfonic acid, a $(C_5\text{-}C_{50})$alkyl-substituted xylenylsulfonic acid, a salt thereof, or any combination thereof.

2. The method of claim 1, further comprising fracturing the subterranean formation with the second composition.

3. A system for performing the method of claim 1, the system comprising:

a tubular disposed in the subterranean formation; and pump configured to pump the first or second composition in the subterranean formation through the tubular.

4. A method of treating a subterranean formation, comprising:

sequentially placing in the subterranean formation a penetrating-aid surfactant and a pore-declogging surfactant, wherein the penetrating-aid surfactant is 2,4,7,9-tetramethyldec-5-yne-4,7-diol, having the structure:

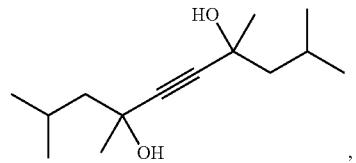 [SMILES: CC(C)CC(C)(O)C#CC(C)(O)CC(C)C]

wherein the pore-declogging surfactant has the structure:

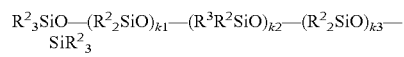

wherein:

at each occurrence, $R^2$ is independently substituted or unsubstituted $(C_1\text{-}C_5)$hydrocarbyl, at each occurrence, $R^3$ is independently substituted or unsubstituted $(C_6\text{-}C_{50})$hydrocarbyl, and k1, k2, and k3 are each independently about 0 to about 10,000, wherein k2+k3 is at least about 1, wherein the pore-declogging surfactant is stearyl dimethicone, a substituted or unsubstituted phenylsulfonic acid, a $(C_5\text{-}C_{50})$alkyl-substituted xylenylsulfonic acid, a salt thereof, or any combination thereof, and wherein:

a first composition comprises the penetrating-aid surfactant, wherein the first composition is at least one of a pre-pad fluid and a pad fluid, a second composition comprises the pore-declogging surfactant, wherein the second composition is a proppant slurry, and about 0.1 wt % to about 20 wt % of the first or second composition is the penetrating-aid surfactant.

5. A method of hydraulically fracturing a subterranean formation, comprising:

placing in the subterranean formation a first composition that is at least one of a pre-pad fluid and a pad fluid, the first composition comprising a penetrating-aid surfactant that is 2,4,7,9-tetramethyldec-5-yne-4,7-diol, having the structure:

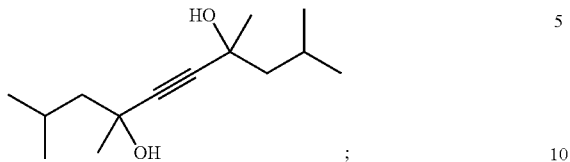

fracturing the subterranean formation with the first composition;

placing in the subterranean formation a second composition that is a proppant slurry, the second composition comprising a pore-declogging surfactant that is:

$R^2{}_3SiO-(R^2{}_2SiO)_{k1}-(R^3R^2SiO)_{k2}-(R^1{}_2SiO)_{k3}-SiR^2{}_3$, wherein:

at each occurrence, $R^2$ is independently substituted or unsubstituted $(C_1\text{-}C_5)$hydrocarbyl, at each occurrence, $R^3$ is independently substituted or unsubstituted $(C_6\text{-}C_{50})$hydrocarbyl, and k1, k2, and k3 are each independently about 0 to about 10,000, wherein k2+k3 is at least about 1, wherein the pore-declogging surfactant is stearyl dimethicone, a substituted or unsubstituted phenylsulfonic acid, a $(C_5\text{-}C_{50})$alkyl-substituted xylenylsulfonic acid, a salt thereof, or any combination thereof; and fracturing the subterranean formation with the second composition.

* * * * *